United States Patent
Baldwin et al.

(10) Patent No.: US 8,725,136 B2
(45) Date of Patent: May 13, 2014

(54) BASEBAND UNIT INTERFACING BETWEEN BASEBAND SECTION AND RADIO FREQUENCY SECTION AND METHOD THEREOF

(75) Inventors: John Henry Baldwin, Morristown, NJ (US); Ken Cheung, Livingston, NJ (US); Peter Giannoglou, Towaco, NJ (US); Kenneth Ho, Ledgewood, NJ (US); Patrick Joseph Hoban, III, Succasunna, NJ (US); Peter Laconte, West Paterson, NJ (US)

(73) Assignee: Alcatel Lucent, Paris (FR)

( * ) Notice: Subject to any disclaimer, the term of this patent is extended or adjusted under 35 U.S.C. 154(b) by 679 days.

(21) Appl. No.: 12/585,979

(22) Filed: Sep. 30, 2009

(65) Prior Publication Data

US 2011/0075616 A1     Mar. 31, 2011

(51) Int. Cl.
*H04M 1/00*     (2006.01)

(52) U.S. Cl.
USPC ............... 455/422.1; 455/552.1; 455/553.1

(58) Field of Classification Search
USPC ........................................ 455/552.1, 553.1
See application file for complete search history.

(56) References Cited

U.S. PATENT DOCUMENTS

2005/0239497 A1* 10/2005 Bahl et al. ............... 455/552.1
2008/0318630 A1* 12/2008 Gil ............................. 455/561

* cited by examiner

*Primary Examiner* — Lewis West
*Assistant Examiner* — Joshua Schwartz
(74) *Attorney, Agent, or Firm* — Harness, Dickey & Pierce

(57) ABSTRACT

The baseband unit includes a first Radio Frequency (RF) coverage unit, a second RF coverage unit, and an interface unit. The first RF coverage unit is configured to communicate with RF devices according to a first communication protocol. The second RF coverage unit is configured to communicate with the RF devices according to a second communication protocol different than the first communication protocol. Further, the interface unit is configured to selectively interface one of the first and second coverage units with the RF devices.

20 Claims, 5 Drawing Sheets

BASEBAND UNIT INTERFACING BETWEEN BASEBAND SECTION AND RADIO FREQUENCY SECTION AND METHOD THEREOF

BACKGROUND

1. Field

One or more example embodiments relate to interfacing between a baseband ("BB") section and a radio frequency ("RF") section, for example, a baseband unit or method for interfacing between a BB section and an RF section.

2. Description of the Related Art

Wireless base stations featuring a distributed architecture are becoming more popular and common at new site deployments of wireless equipment providers. Such distributed architectures include functional (and sometimes physical) separation of baseband (BB) and radio frequency (RF) sections of a base station.

Attempts have been made to standardize the communication protocol between the BB and RF sections, but different protocols are preferred in different applications. For example, in large RF coverage area (high power) applications, the remote RF devices (also known as remote radio heads) are expected to operate over a Common Public Radio Interface (CPRI) communication link.

On the other hand, small RF coverage area (low power) applications, such as in-building environments, often employ a high number of very small remote RF devices that operate over a more commonly used communication link, such as Gigabit Ethernet, because such a network of links may already be in place throughout the building.

To meet these different needs, the wireless equipment providers develop different wireless baseband (BB) products to match up with the various interfaces expected at the remote RF devices. The wireless equipment providers use a multiplicity of BB products because the timing schemes and data stacking protocols differ significantly for these different communication interfaces, and usually cannot be supported by a common set of components and circuits.

SUMMARY

According to an example embodiment, a baseband unit includes a first Radio Frequency (RF) coverage unit, a second RF coverage unit, and an interface unit. The first RF coverage unit is configured to communicate with RF devices according to a first communication protocol. The second RF coverage unit is configured to communicate with the RF devices according to a second communication protocol different than the first communication protocol. Further, the interface unit is configured to selectively interface one of the first and second coverage units with the RF devices.

In an example embodiment, the interface unit includes a mode select unit and a serializer/deserializer (SERDES) unit. The mode select unit is configured to selectively transmit data to and from one of the first and second RF coverage units based on at least one of a plurality of control signals. The serializer/deserializer (SERDES) unit is configured to convert parallel data from the mode select unit to serial data at different data rates and configured to convert serial data from at least one of the RF devices to parallel data at different data rates.

In an example embodiment, the interface unit further includes a clock select unit. The clock select unit is configured to select and output one of a plurality of clocks based on at least one of the plurality of control signals. Further, the SERDES unit is configured to convert the parallel data from the mode select unit to the serial data at a data rate based on the selected clock signal and configured to convert the serial data from at least one of the RF devices to the parallel data at a data rate based on the selected clock signal.

In an example embodiment, the clock select unit is configured to select and output a first clock of the plurality of clocks if the SERDES unit is associated with the first communication protocol and is configured to select and output a second clock of the plurality of clocks if the SERDES unit is associated with the second communication protocol.

In an example embodiment, the first communication protocol is a Common Public Radio Interface (CPRI) communication protocol and the second communication protocol is an Ethernet communication protocol.

In an example embodiment, the first clock is N multiples of 61.44 Megahertz (MHz) and the second clock is N multiples of 62.5 MHz, where N is a natural number greater than or equal to 1.

In an example embodiment, the baseband unit further includes a baseband processor configured to generate and output the plurality of control signals and a timing unit configured to output the first clock.

In an example embodiment, the baseband unit further includes a transceiver configured to support transmission of data across a physical medium between the SERDES unit and at least one of the RF devices.

In an example embodiment, the transceiver is configured to be pluggable in to the SERDES unit such that a different type of the transceiver is plugged in to the SERDES unit according to a different type of the physical medium.

In an example embodiment, the baseband unit further includes at least one modem unit configured to transmit the data between at least one of the first and second RF coverage units and a network.

In an example embodiment, the interface unit further includes a routing unit configured to route the data between the at least one modem unit and at least one of the first and second RF coverage units based on at least one of the plurality of control signals.

In an example embodiment, the first and second coverage units include at least one of a field-programmable gate array (FPGA) and an application-specific integrated circuit (ASIC).

In an example embodiment, the first and second RF coverage units are configured to operate simultaneously.

In an example embodiment, the first RF coverage unit and at least one of the RF devices share a synchronous timing scheme with respect to the first communication protocol, and the second RF coverage unit and at least one of the RF devices share an asynchronous timing scheme with respect to the second communication protocol.

According to an example embodiment, a communication network includes a plurality of the baseband units, where at least two of the plurality of baseband units are linked together such that resources are shared between the at least two linked baseband units.

According to an example embodiment, a communication network includes a plurality of the baseband units, where at least two of the plurality of baseband units are part of a single integrated network such that operations, administration and maintenance (OA&M) by a service provider of the at least two of the plurality of baseband units are unified.

According to an example embodiment, a method for interfacing between a baseband (BB) section and Radio Frequency (RF) section using a baseband unit includes first communicating, second communicating and selectively interfacing. The first communicating, using the baseband unit, communicating with at least one of a plurality of RF devices according to a first communication protocol. The second communicating, using the baseband unit, communicating with at least one of the plurality of RF devices according to a second communication protocol. The selectively interfacing, using the baseband unit, interfacing one of the first and second communication interfaces with at least one of the RF devices.

BRIEF DESCRIPTION

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION

Figure 1:
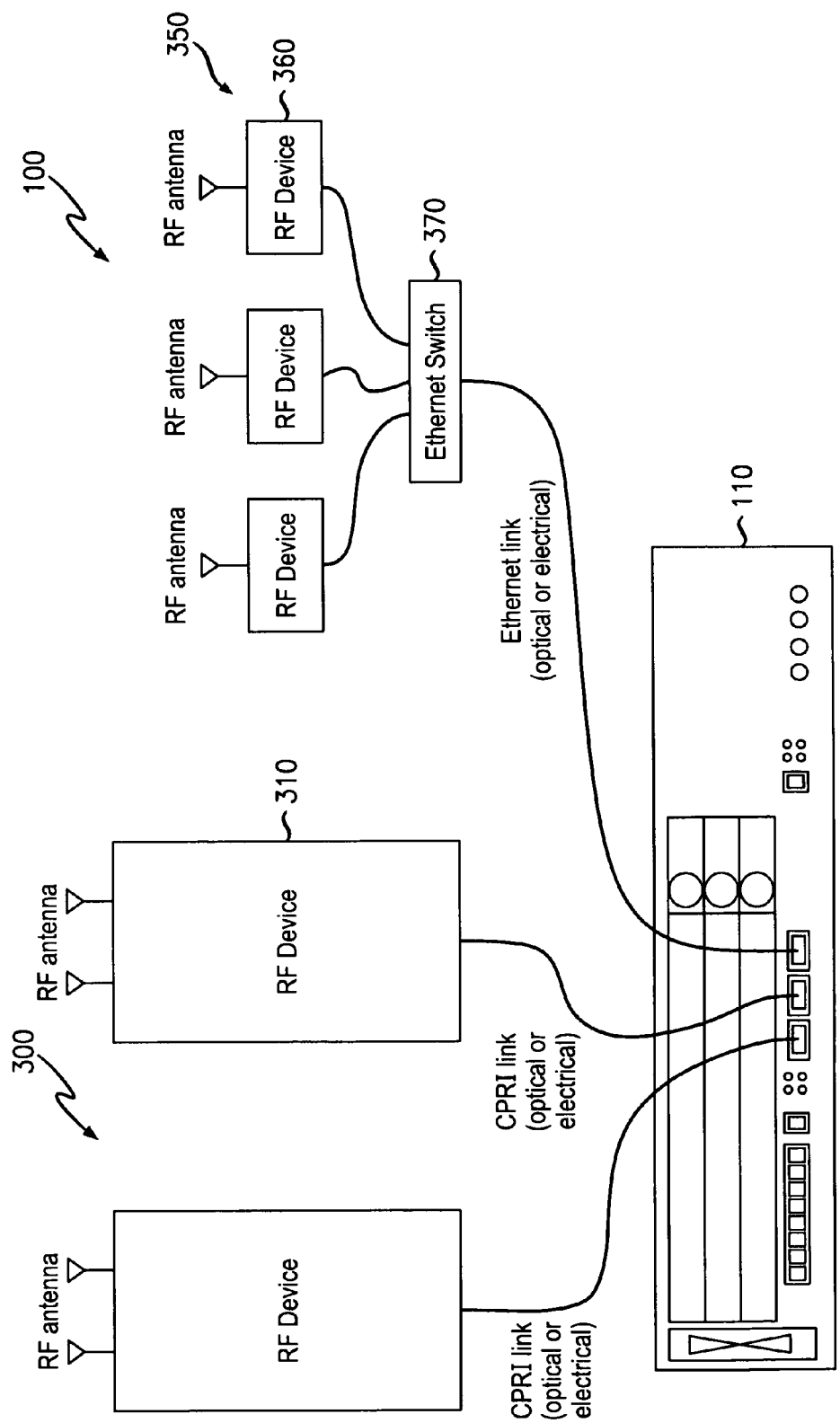
FIG. 1 illustrates a baseband unit system according to an example embodiment.

Various example embodiments will now be described more fully with reference to the accompanying drawings.

Specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent", etc.).

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Specific details are given in the following description to provide a thorough understanding of example embodiments. However, it will be understood by one of ordinary skill in the art that example embodiments may be practiced without these specific details. For example, systems may be shown in block diagrams in order not to obscure example embodiments in unnecessary detail. In other instances, well-known processes, structures and techniques may be shown without unnecessary detail in order to avoid obscuring example embodiments.

Also, it is noted that example embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but could have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "mobile" may be considered synonymous to, and may hereafter be occasionally referred to, as a mobile unit, mobile station, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS), base station (BS), Node B, etc. and may describe equipment that provides data and/or voice connectivity between a network and one or more users.

As is well-known in the art, each of a mobile and a base station may have transmission and reception capabilities. Transmission from the base station to the mobile is referred to as downlink or forward link communication. Transmission from the mobile to the base station is referred to as uplink or reverse link communication.

FIG. 1 illustrates a baseband ("BB") unit system 100 according to an example embodiment. In FIG. 1, the BB unit system 100 includes a BB unit 110, a first set 300 of first radio frequency ("RF") devices 310 and a second set 350 of second RF devices 360. The RF first devices 310 communicate with the BB unit 110 using a CPRI communication protocol over an optical or electrical link. The BB unit system 100 further includes an Ethernet switch 370 connected between the second set 350 of second RF devices 360 and the BB unit 110. The second RF devices 350 communicate with the BB unit 110 using an Ethernet communication protocol over an optical or electrical link. However, example embodiments may also include the BB unit 110 communicating with RF devices using other types of communication protocols known in the art.

While the RF devices 310 and 360 are shown to communicate with the BB unit 110 using optical or electrical connections, example embodiments may use different types of connections, such as other types of wired connections or wireless connections.

The RF devices 310 and 360 also include one or more antennas to communicate with user devices, such as mobile devices, wireless internet cards, and Personal Digital Assistants ("PDAs").

As shown in FIG. 1, the single BB unit 110 may support multiple communication interfaces to different types of remote RF devices 310 and 360. Thus, the BB unit 110 provides a more effective and flexible design. As a result, an overall product portfolio of the equipment provider (or seller) and the service provider (or buyer) is more streamlined and network planning is simplified by having a uniform baseband solution throughout a network.

For example, the wireless service provider may carry only one type of baseband product, such as the BB unit 110, even if one or more different types of applications or communication protocols are deployed. This is because a single one of the BB units 110 will allow for the simultaneous operation of multiple types of interfaces to multiple types of remote RF devices over multiple types of connections.

Figure 2:
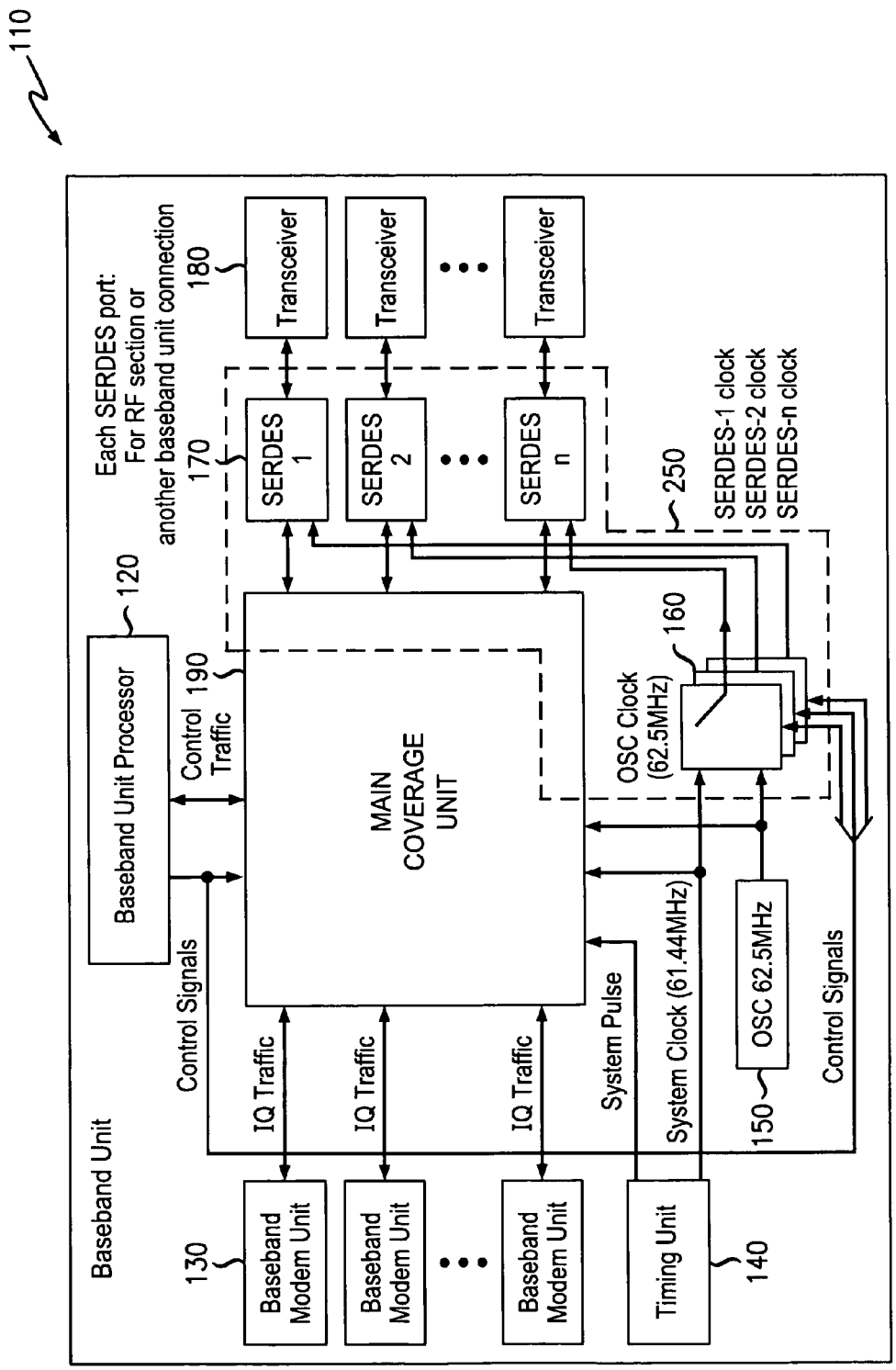
FIG. 2 illustrates an example of a block diagram of the baseband unit in FIG. 1.

FIG. 2 illustrates an example of a block diagram of the BB unit 110 in FIG. 1. In FIG. 2, the BB unit 110 includes a BB unit processor 120, a plurality of BB modem units 130, a timing unit 140, an oscillator ("OSC") 150, a plurality of transceivers 180, a main coverage unit 190 and an interface unit 250.

The interface unit 250 further includes a plurality of clock select units 160, a plurality of SERializer and DE-Serializer ("SERDES") units 1-n 170, and a part of the main coverage unit 190. The main interface unit 250 will be described in further detail below and with respect to FIG. 3.

The BB unit processor 120 is configured to generate and output a plurality of control signals to the main coverage unit 190 and the plurality of clock select units 160. The BB unit processor 120 is also configured to transmit and receive control traffic or packets to and from the main coverage unit 190.

The plurality of BB modem units 130 are configured to transmit IQ traffic (or user data) between the main coverage unit 190 and the network (not shown) of the service provider. The plurality of BB modem units 170 may include hardware and/or software capable of receiving, processing and forwarding the IQ traffic. For example, the plurality of BB modem units 130 may each include a processor (not shown), a memory (not shown) that may store data and/or programs for use with the processor and/or a modulator and demodulator to process the IQ traffic.

The timing unit 140 is configured to generate and output a system pulse to the main coverage unit 190 and a system clock (or first clock) to both the plurality of clock select units 160 and the main coverage unit 190. The oscillator ("OSC") 150 is configured to output a reference clock (or second clock) to the plurality of clock select units 160. The system clock may be N multiples of 61.44 Megahertz (MHz) and the reference clock may be N multiples of 62.5 MHz, where N is a natural number greater than or equal to 1. The system pulse may, for example, have a frequency of 1 Hz. The timing unit 140 and the OSC 150 may include hardware and/or software capable of generating and outputting clock signals and/or pulses. For example, the timing unit 140 and the OSC 150 may each include a processor (not shown) and a memory (not shown) that may store data and/or programs for use with the processor.

The plurality of clock select units 160 of the interface unit 250 are configured to select and output one of a plurality of clocks based on at least one of the plurality of control signals. In FIG. 2, each of the clock select units 160 selects from one of the system clock and the reference clock based on one of the plurality of control signals and outputs the selected clock SERDES-1 to SERDES-n clocks to a corresponding one of the SERDES units 1-n 170.

Each of the clock select units 160 may receive a separate one of the control signals or at least two of the clock select units 160 may share one of the control signals, according to an implementation decision of the service provider. For example, if a group of clock select units 160 all correspond to SERDES units 170 servicing a same type of RF device 310 or 360, the group of clock select units 160 may receive the same control signal from the BB unit processor 120. While FIG. 2 shows each of the SERDES units 170 1-n to receive a corresponding one of the selected clocks SERDES-1 to SERDES-n clocks, example embodiments may also include one or more of the SERDES units 170 1-n sharing a same selected clock.

The plurality of clock select units 160 may include hardware and/or software capable of receiving and selecting signals. For example, the plurality of clock select units 160 may each include a switch or multiplexer to select one of the system clock and the reference clock in response to one of the plurality of control signals. The plurality of clock select units 160 will be explained in greater detail below with respect to FIG. 3.

The plurality of SERDES units 1-n 170 of the interface unit 250 are configured to convert parallel data from the main coverage unit 190 to serial data at different data rates and configured to convert serial data from at least one of the RF devices 310 or 360 via a corresponding one of the transceivers 180 to parallel data at different data rates. The plurality of SERDES units 1-n 170 may include hardware and/or software capable of converting between serial and parallel data. For example, the plurality of SERDES units 1-n 170 may each include a processor (not shown) and a memory (not shown), such as a register, that may store data and/or programs for use with the processor. The plurality of SERDES units 1-n 170 will be explained in greater detail with respect to FIG. 3.

The plurality of transceivers 180 are configured to support transmission of data across a physical medium between the SERDES units 170 1-n and at least one of the RF devices 310 or 360. Each of the transceivers 180 is configured to be pluggable into a corresponding one of the SERDES units 170 such that a different type of the transceiver is plugged into the corresponding SERDES unit 170 according to a different type of the physical medium.

The plurality of transceivers 180 may include hardware and/or software capable of transmitting and receiving traffic. For example, the plurality of transceivers 180 may each include a processor (not shown) and a memory (not shown) that may store data and/or programs for use with the processor.

The main coverage unit 190 is configured to support and interface with the plurality of BB modem units 130 and the plurality of SERDES units 1-n 170. The main coverage unit 190 is controlled by the BB unit processor 120 via the plurality of control signals.

The main coverage unit 190 may include hardware and/or software capable of receiving, collecting, processing and forwarding traffic from the plurality of BB modem units 130, the BB unit processor 120 and the plurality of SERDES units 170, as well as signals from the BB unit processor 120, the timing unit 140 and the OSC 150. For example, the main coverage unit 190 may include at least one of a field-programmable gate array (FPGA) and an application-specific integrated circuit (ASIC) having at least one processor (not shown) and at least one memory (not shown) that may store data and/or programs for use with the processor. The main coverage unit 190 will be explained in greater detail with respect to FIG. 3.

Figure 3:
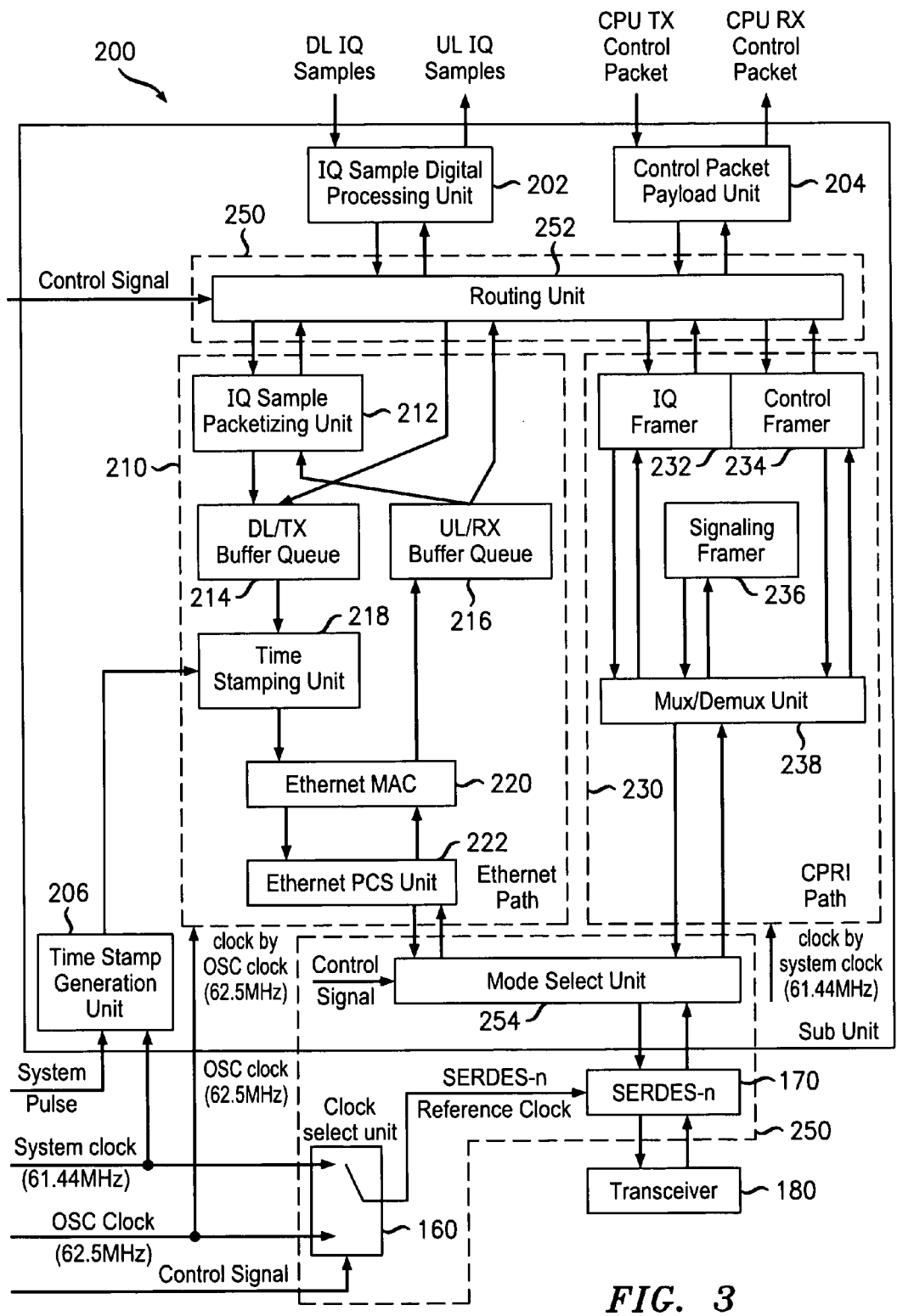
FIG. 3 illustrates an example of a block diagram of a main coverage unit and an interface unit of the baseband unit in FIG. 2.

FIG. 3 illustrates an example of a block diagram of the main coverage unit 190 and the interface unit 250 of the BB unit 110 in FIG. 2.

The main coverage unit 190 includes a plurality of sub units 200. Each of the sub units 200 corresponds to one of the SERDES units 170. While FIG. 3 only shows one of the sub units 200, it will be understood an operation and structure of the other sub units 200 may be similar to the sub unit 200 shown in FIG. 3. The sub unit 200 includes an IQ sample digital processing unit 202, a control packet payload unit 204, a time stamp generation unit 206, a first RF coverage unit 210, a second RF coverage unit 230, and the interface unit 250.

The first RF coverage unit 210 is configured to communicate with the first RF devices 310 according to a first communication protocol. The second RF coverage unit 230 is configured to communicate with the second RF devices 360 according to a second communication protocol different than the first communication protocol. For example, in FIG. 3, the first RF coverage unit 210 is for an Ethernet path and the second RF coverage unit 230 is for a CPRI path. Thus, the first communication protocol may be an Ethernet communication protocol and the second communication protocol may be a CPRI communication protocol. The first and second RF coverage units 210 and 230 are configured to operate simultaneously.

The first RF coverage unit 210 includes an IQ sample packetizing unit 212, a download/transmission ("DL/TX") buffer queue 214, an upload/reception ("UL/RX") buffer queue 216, a time stamping unit 218, an Ethernet Media Access Controller ("MAC") 220, and an Ethernet Physical Coding Sublayer ("PCS") unit 222.

The second RF coverage unit 230 includes an IQ framer 232, a control framer 234, a signaling framer 236 and a mux/demux unit 238.

The interface unit 250 is configured to selectively interface one of the first and second coverage units with the RF devices 310 or 360. For each of the sub units 200, the interface unit 250 includes a routing unit 252, a mode select unit 254, the clock select unit 160 and the SERDES unit 170.

A routing pool (not shown) is configured to analyze and route the incoming and outgoing IQ traffic between the plurality of BB modem units 130 and each of the sub units 200. For example, the routing pool may analyze IQ traffic from one of the BB modem units 130 and determine to which of the SERDES units 170 to direct the analyzed IQ traffic. The routing pool may include hardware and/or software capable of receiving, collecting, processing and routing the IQ traffic. For example, the routing pool may include a processor (not shown), memory (not shown) that may store the IQ traffic and/or programs for use with the processor, and/or switches or other routing means controlled by the processor to route the IQ traffic.

Referring to the sub-unit 200, the IQ sample digital processing unit 202 is configured to process and route IQ data between the routing unit 252 and one or more of the BB modem units 130 via the routing pool. The IQ sample digital processing unit 126 may include hardware and/or software capable of receiving, collecting and processing the IQ traffic. For example, the IQ sample digital processing unit 202 may include a processor (not shown) and/or a memory (not shown) that may store data and/or programs for use with the processor to implement a peak limiting function, a scaling function, a power control function, and/or other general digital processing functions.

The control packet payload unit 204 is configured to route control traffic between the BB unit processor 120 and the routing unit 252. The control packet payload unit 204 may include hardware and/or software capable of receiving, collecting and processing control traffic. For example, the control packet payload unit 128 may include a processor (not shown) and/or a memory (not shown) that may store data and/or programs for use with the processor.

The routing unit 252 of the interface unit 250 is configured to route the IQ traffic between the at least one of the BB modem units 130 and at least one of the first and second RF coverage units 210 and 230 based on at least one of the plurality of control signals received from the BB unit processor 120. The routing unit 252 is also configured to route control traffic between the BB unit processor 120 and at least one of the first and second RF coverage units 210 and 230 based on at least one of the plurality of control signals received from the BB unit processor 120. In FIG. 3, the routing unit 252 receives IQ traffic via the IQ sample digital processing unit 202 and receives the control traffic via the control packet payload unit 204. The routing unit 252 may be implemented using hardware and/or software, including a multiplexer.

Referring to the first RF coverage unit 210, the IQ sample packetizing unit 212 is configured to packetize and forward IQ traffic received from the routing unit 252 to the DL/TX buffer queue 214 and is configured to packetize and forward IQ traffic received from the UL/RX buffer queue 216 to the routing unit 252, according to the Ethernet communication protocol. The IQ sample packetizing unit 212 may include hardware and/or software capable of receiving, processing and forwarding the IQ traffic or packets For example, the IQ sample packetizing unit 212 may include a processor (not shown) and a memory (not shown) that may store data and/or programs for use with the processor.

The DL/TX buffer queue 214 is configured to temporarily store IQ traffic or packets from the IQ sample packetizing unit 212 and control traffic from the routing unit 252 and forward the stored traffic to the time stamping unit 218. The DL/TX buffer queue 214 may include hardware and/or software capable of receiving, storing and forwarding the IQ traffic or packets. For example, the DL/TX buffer queue 214 may include a processor (not shown) and a memory (not shown) that may store IQ or control traffic or packets and/or programs for use with the processor.

The UL/RX buffer queue 216 is configured to temporarily store traffic received from the Ethernet MAC and to forward IQ traffic to the IQ sample packetizing unit 212 and to forward control traffic to the routing unit 252. The UL/RX buffer queue 216 may include hardware and/or software capable of receiving, storing and forwarding the IQ traffic or packets. For example, the UL/RX buffer queue 216 may include a processor (not shown) and a memory (not shown) that may store IQ or control traffic or packets and/or programs for use with the processor.

The time stamping unit 218 is configured to add a time stamp to the packets received from the DL/TX buffer queue 214 and forward the time-stamped packets to the Ethernet MAC controller 220. The time stamping unit 218 may receive from the time stamp generation unit 206. The time stamping unit 218 may include hardware and/or software capable of receiving, storing, processing and forwarding data. For example, the time stamping unit 218 may include a processor (not shown) and a memory (not shown) that may store data and/or programs for use with the processor.

The time stamp generation unit 206 generates and forwards the time stamp to the time stamping unit 218 based on the system pulse and the system clock. For example, the time stamp generation unit 206 may determine which clock cycle (from the 61,440,000 cycles every second) of the system clock aligns with a beginning of a clock cycle of the system pulse, in order to generate the time stamp. The time stamp generation unit 206 may include hardware and/or software capable of receiving, processing, and outputting signals. For example, the time stamp generation unit 206 may include a processor (not shown) and a memory (not shown) that may store data and/or programs for use with the processor.

The Ethernet MAC 220 is configured to provide addressing and channel access control mechanisms for the time-stamped packets received from the time stamping unit 218 and forward these packets to the Ethernet PCS unit 222, according to the Ethernet communication protocol. The Ethernet MAC 220 is also configured to provide addressing and channel access control mechanisms for traffic received from the Ethernet PCS unit 222 and forward this traffic to the UL/RX buffer queue 216, according to the Ethernet communication protocol. The Ethernet MAC 220 may include hardware and/or software capable of receiving, storing, processing and forwarding data. For example, the Ethernet MAC 220 may include a processor (not shown) and a memory (not shown) that may store data and/or programs for use with the processor.

The Ethernet PCS unit 222 is configured to define physical layer specifications for the packets received from the Ethernet MAC 220 and forward these packets to the mode select unit 254, according to the Ethernet communication protocol. The Ethernet PCS unit 222 is also configured to define physical layer specifications for the traffic received from the mode select unit and forward this traffic to the Ethernet MAC 220, according to the Ethernet communication protocol. The Ethernet PCS unit 222 may include hardware and/or software capable of receiving, storing, processing and forwarding data. For example, the Ethernet PCS unit 222 may include a processor (not shown) and a memory (not shown) that may store data and/or programs for use with the processor.

Referring to the second RF coverage unit 230, the IQ framer 232 is configured to arrange the IQ traffic between the routing unit 252 and the mux/demux unit 238 into frames, according to the CPRI communication protocol. The control framer 234 is configured to arrange control information between the routing unit 252 and the mux/demux unit 238 into frames, according to the CPRI communication protocol. The control information may, for example, include data for controlling operations of an associated RF device 310 or 360. The signaling framer 236 is configured to provide and receive encoding information to and from the mux/demux unit 238 in order to maintain the CPRI communication link between the BB unit 110 and the associated RF device 310 or 360.

The mux/demux 238 unit is configured to combine information received from the IQ framer 232, the control framer 234 and the signaling framer 236 and forward this information to the mode select unit 254, according to the CPRI communication protocol. The mux/demux unit 238 is also configured to split information received from the mode select unit 254 between the IQ framer 232, the control framer 234 and the signaling framer 236, according to the CPRI communication protocol. The mux/demux unit 238 may include a multiplexer and a demultiplexer and use time-division multiplexing and demultiplexing to carry out the above operations.

The mode select unit 252 of the interface unit 250 is configured to selectively transmit data to and from one of the first and second RF coverage units based on at least one of the plurality of control signals received from the BB unit processor 120. The mode select unit 252 may be implemented using hardware and/or software, including a multiplexer.

The SERDES unit 170 of the interface unit 250 is configured to convert the parallel data from the mode select unit 254 to the serial data at a data rate based on the selected clock signal of the clock select unit 160 and configured to convert the serial data from at least one of the RF devices 310 or 360 to the parallel data at a data rate based on the selected clock signal of the clock select unit 160. In FIG. 3, the clock select unit 160 is shown to output the selected clock signal SERDES-n clock to the SERDES-n unit 170.

For example, the clock select unit 160 of the interface unit 250 is configured to select and output the system clock if the corresponding SERDES unit 170 is associated with the CPRI communication protocol (or the first communication protocol) and is configured to select and output the reference clock if the corresponding SERDES unit 170 is associated with the Ethernet protocol (or the second communication protocol). Whether the corresponding SERDES unit 170 is associated with CPRI or Ethernet communication protocol is set by the BB processor unit 120 according to a preference of the service provider. Further, the clock select unit 160 is controlled by the BB processor unit 120 via at least one of the plurality of control signals.

A data rate of the SERDES unit 170 varies according to the clock selected by the clock select unit 160 because the data rate is different between the CPRI communication protocol and the Ethernet communication protocol. For example, the data rate of the SERDES unit 170 may be based on a multiple of 61.44 MHz for the CPRI communication protocol, and the data rate of the SERDES unit 170 may be based on 1.25 Gigabits per second ("Gbps") for the Ethernet communication protocol. The SERDES unit 170 may be programmable by the BB unit processor 120 to operate at different serial rates for the CPRI and Ethernet communication protocols.

The RF devices 310 and 360 generally need to recover system timing information from the BB unit 110 in order to efficiently and correctly receive information from the BB unit 110. As shown in FIG. 3, a timing scheme of the first RF coverage units is clocked according to the reference clock and a timing scheme of the second RF coverage unit is clocked according to the system clock.

Therefore, the CPRI communication protocol is synchronous because the SERDES unit 170 and the second RF coverage unit 230 are both driven at a same frequency (e.g., a multiple of 61.44 MHz) for the CPRI communication protocol.

However, the Ethernet communication protocol is asynchronous because the first RF coverage unit 210 and the SERDES unit 170 are driven a different frequencies, such as 62.5 MHz for the first RF coverage unit and 61.44 MHz for the SERDES unit 170. Therefore, the Ethernet communication protocol does not support synchronous clock traceability between the BB unit system 110 and the RF devices 310 or 360. Thus, a timing recovery scheme based on time stamping each Ethernet packet from BB unit 110 to the RF device 310 or 360 is used, as explained above with respect to the time stamping unit 218 and the time stamp generation unit 206.

Hence, the first RF coverage unit 210 and at least one of the RF devices 310 or 360 share an asynchronous timing scheme with respect to the Ethernet communication protocol, and the second RF coverage unit 230 and at least one of the RF devices 310 or 360 share a synchronous timing scheme with respect to the CPRI communication protocol.

Nonetheless, as explained above, the sub unit 200 along with the interface unit 250, is able to flexibility accommodate either of the CPRI or Ethernet communication protocols, irrespective of their different timing schemes, for each of the SERDES units 170 in the single baseband unit 110.

Figure 4:
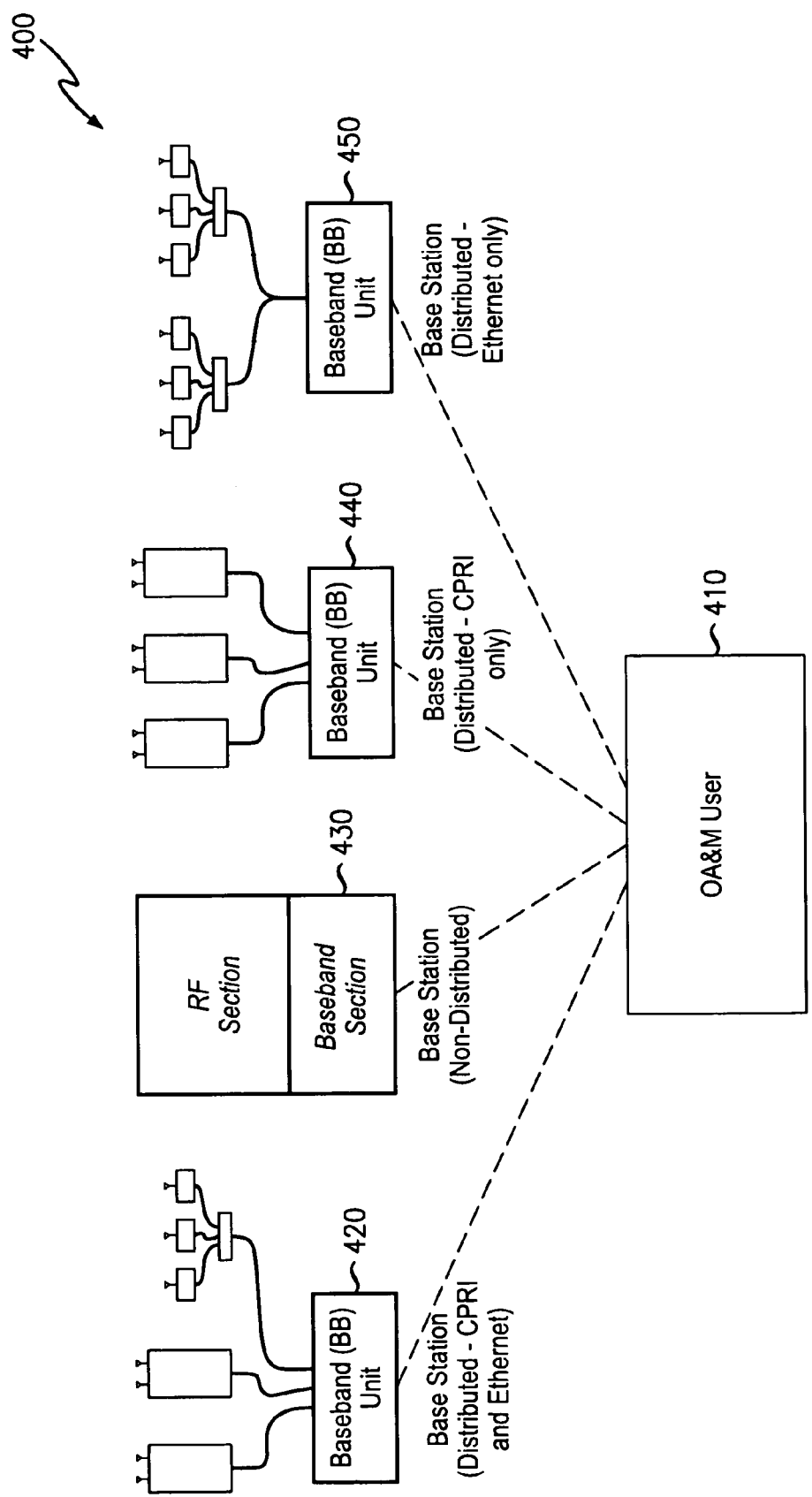
FIG. 4 illustrates a communication network including a plurality of baseband unit systems according to an example embodiment.

FIG. 4 illustrates a communication network 400 including a plurality of BB unit systems according to an example embodiment.

In FIG. 4, a communication network 400 includes a plurality of different BB unit systems 420-450, where at least two of a plurality of BB units of the plurality of the different BB unit systems 420-450 are part of a single integrated network, irrespective of whether the RF architecture is distributed (CPRI, Ethernet, etc.) or non-distributed. This allows for unification, and therefore simplification of operations, administration and maintenance (OA&M) by an OA&M user 410 of the service provider for at least two of the plurality of BB units. For example, the OA&M user 410 may monitor the different BB unit systems 420-450 in a uniform manner, such as on a single screen or single visual interface.

Figure 5:
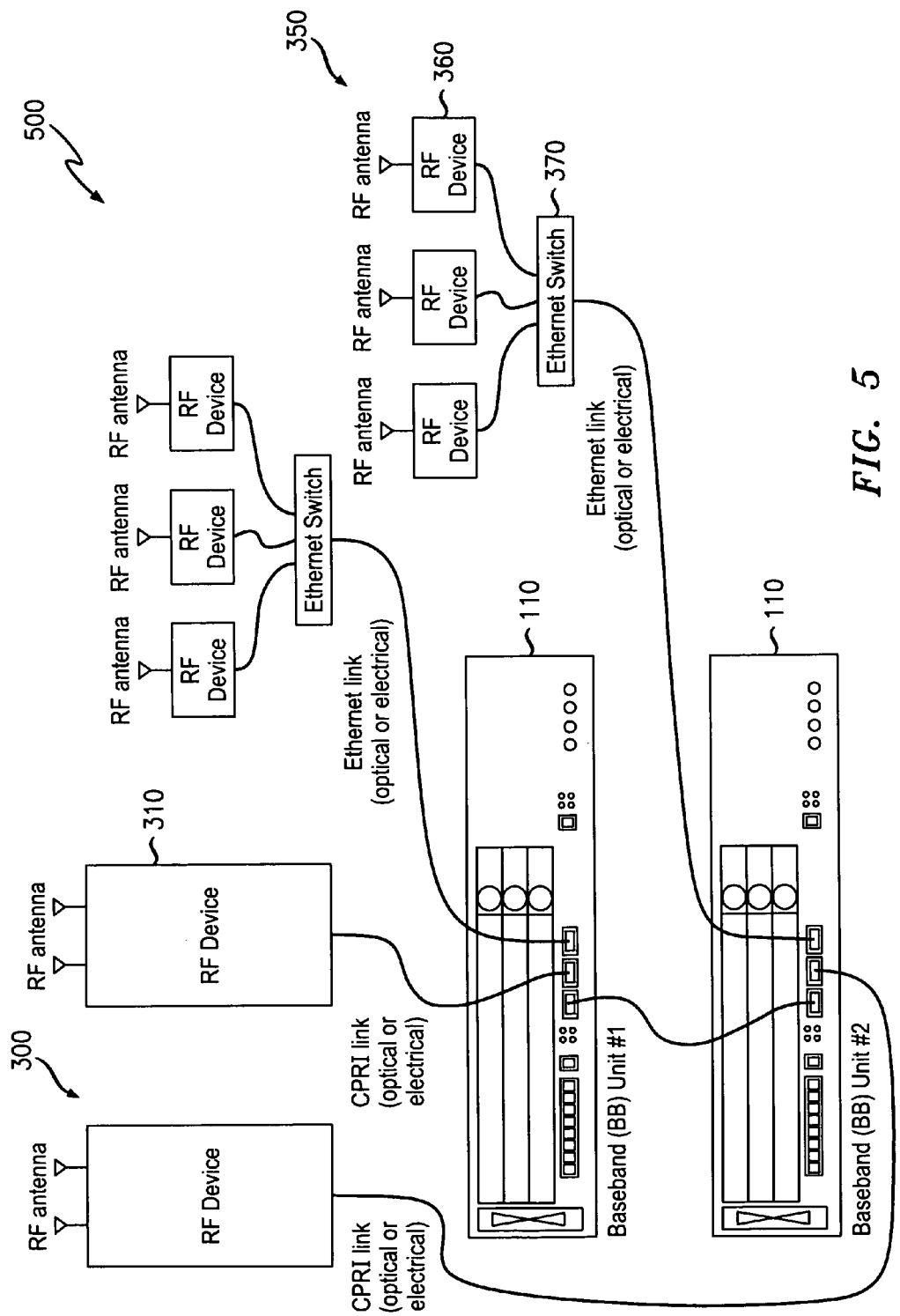
FIG. 5 illustrates another communication network including a plurality of baseband units according to an example embodiment.

FIG. 5 illustrates another communication network including a plurality of BB units according to an example embodiment. In FIG. 5, a communication network 500 includes a plurality of the BB units 110, where at least two of the plurality of BB units 110 are linked together such that resources are shared between the at least two linked BB units 110.

In such an arrangement, as shown in FIG. 5, BB signals that would customarily be directed to the RF device 310 or 360 would instead be routed to another BB unit 110, thereby linking two or more BB units 110 to function as a single larger BB unit. This offers more flexibility and modularity to grow baseband capacity as needed by integrating and pooling resources (e.g., channel elements) across multiple BB units 110.

All of the above described functions may be readily carried out by special or general purpose digital information processing devices acting under appropriate instructions embodied, e.g., in software, firmware, or hardware programming.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

Example embodiments being thus described, it will be obvious that the same may be varied in many ways. For example, while example embodiments have shown the BB unit 110 configured to only select between two types of communication protocols, example embodiments are not limited thereto and may be configured to select between more than two types of communication protocols. Such variations are not to be regarded as a departure from the invention, and all such modifications are intended to be included within the scope of the invention.

We claim:

1. A baseband unit, comprising:
   a first Radio Frequency (RF) coverage unit configured to communicate with first RF devices according to a first communication protocol, the first RF coverage unit operating at a different frequency from the first RF devices; and
   a second RF coverage unit configured to communicate with second RF devices according to a second communication protocol different than the first communication protocol, the first RF devices and the second RF devices configured to communicate with mobile user devices via RF protocols; and
   an interface unit configured to selectively interface one of the first and second coverage units with the first RF devices and the second RF devices, the interface unit including a serializer/deserializer (SERDES) unit configured to communicate with the first RF devices at a first data rate set according to the first communication protocol, and communicate with the second RF devices at a second data rate set according to the second communication protocol, wherein data transferred from the first RF coverage unit to the first RF devices operating at different frequencies includes a time stamp for the first RF devices to recover system timing information of the first RF coverage unit.

2. The baseband unit of claim 1, wherein the first and second coverage units include at least one of a field-programmable gate array (FPGA) and an application-specific integrated circuit (ASIC).

3. The baseband unit of claim 1, wherein the first and second RF coverage units are configured to operate simultaneously.

4. The baseband unit of claim 1, wherein
the first RF coverage unit and the first RF devices share a synchronous timing scheme with respect to the first communication protocol, and
the second RF coverage unit and the second RF devices share an asynchronous timing scheme with respect to the second communication protocol.

5. A communication network, comprising:
a plurality of the baseband units of claim 1, wherein
at least two of the plurality of baseband units are linked together such that resources are shared between the at least two linked baseband units.

6. A communication network, comprising:
a plurality of the baseband units of claim 1, wherein
at least two of the plurality of baseband units are part of a single integrated network such that operations, administration and maintenance (OA&M) by a service provider of the at least two of the plurality of baseband units are unified.

7. The baseband unit of claim 1, wherein the interface unit comprises:
a mode select unit configured to selectively transmit data to and from one of the first and second RF coverage units based on at least one of a plurality of control signals; and
the SERDES unit is configured to convert parallel data from the mode select unit to serial data at different data rates and configured to convert serial data from the first RF devices and the second RF devices to parallel data at different data rates.

8. The baseband unit of claim 7, wherein the interface unit further comprises:
a clock select unit configured to select and output one of a plurality of clocks based on at least one of the plurality of control signals, wherein
the SERDES unit is configured to convert the parallel data from the mode select unit to the serial data at a data rate based on the selected clock signal and configured to convert the serial data from the first RF devices and the second RF devices to the parallel data at a data rate based on the selected clock signal.

9. The baseband unit of claim 8, wherein the clock select unit is configured to select and output a first clock of the plurality of clocks if the SERDES unit is associated with the first communication protocol and is configured to select and output a second clock of the plurality of clocks if the SERDES unit is associated with the second communication protocol.

10. The baseband unit of claim 9, further comprising:
a baseband processor configured to generate and output the plurality of control signals; and
a timing unit configured to output the first clock.

11. The baseband unit of claim 9, wherein,
the first communication protocol is a Common Public Radio Interface (CPRI) communication protocol; and
the second communication protocol is an Ethernet communication protocol.

12. The baseband unit of claim 11, wherein the first clock is N multiples of 61.44 Megahertz (MHz) and the second clock is N multiples of 62.5 MHz, where N is a natural number greater than or equal to 1.

13. The baseband unit of claim 7, further comprising:
a transceiver configured to support transmission of data across a physical medium between the SERDES unit and the first RF devices and second RF devices.

14. The baseband unit of claim 13, wherein the transceiver is configured to be pluggable in to the SERDES unit such that a different type of the transceiver is plugged in to the SERDES unit according to a different type of the physical medium.

15. The baseband unit of claim 7, further comprising:
at least one modem unit configured to transmit the data between at least one of the first and second RF coverage units and a network.

16. The baseband unit of claim 15, wherein the interface unit further comprises:
a routing unit configured to route the data between the at least one modem unit and at least one of the first and second RF coverage units based on at least one of the plurality of control signals.

17. A method for interfacing between a baseband (BB) section and Radio Frequency (RF) section using a baseband unit, comprising: first communicating, using the baseband unit, with first RF devices according to a first communication protocol—the baseband unit operating at a different frequency from the first RF devices;
second communicating, using the baseband unit, with second RF devices according to a second communication protocol, the first RF devices and the second RF devices configured to communicate with mobile user devices via RF protocols; and selectively interfacing, using the baseband unit, one of the first and second communication interfaces with the first RF devices and the second RF devices to communicate, using a serializer/deserializer with the first RF devices at a first data rate set according to the first communication protocol, and communicate with the second RF devices at a second data rate set according to the second communication protocol,
wherein data transferred to the first RF devices operating at different frequencies includes a time stamp for the first RF devices to recover system timing information of the baseband unit.

18. The method of claim 17, wherein the selectively interfacing comprises:
selectively transmitting data to and from one of the first and second communicating based on at least one of a plurality of control signals; and
converting parallel data from the selectively transmitting to serial data at different data rates and converting serial data from the first RF devices and the second RF devices to parallel data at different data rates.

19. The method of claim 18, wherein the selectively interfacing further comprises:
selecting and outputting one of a plurality of clocks based on at least one of the plurality of control signals, wherein
the converting the parallel data from the selectively transmitting to the serial data at a data rate based on the selected clock signal and the converting the serial data from the first RF devices and the second RF devices to the parallel data at a data rate based on the selected clock signal.

20. The method of claim 19, wherein,
the selecting and outputting selects and outputs a first clock of the plurality of clocks if the converting is associated with the first communication protocol and selects and outputs a second clock of the plurality of clocks if the converting is associated with the second communication protocol, and
the first communicating uses a Common Public Radio Interface (CPRI) communication protocol as the first communication protocol and the second communicating uses an Ethernet communication protocol as the second communication protocol.

* * * * *